(12) United States Patent  
Hawkins

(10) Patent No.: US 7,488,008 B2
(45) Date of Patent: Feb. 10, 2009

(54) VARI-STAGE COUPLING DEVICE

(75) Inventor: Stanley Hawkins, Visalia, CA (US)

(73) Assignee: Jain Irrigation, Inc., Ontario, CA (US)

( * ) Notice: Subject to any disclaimer, the term of this patent is extended or adjusted under 35 U.S.C. 154(b) by 336 days.

(21) Appl. No.: 11/460,757

(22) Filed: Jul. 28, 2006

(65) Prior Publication Data

US 2008/0061552 A1   Mar. 13, 2008

(51) Int. Cl.
*F16L 25/08* (2006.01)
*F16L 25/14* (2006.01)
*F16L 21/08* (2006.01)

(52) U.S. Cl. .................. 285/332; 285/293.1; 285/332.1; 285/417

(58) Field of Classification Search ............... 285/104, 285/232, 255, 293.1, 295.1, 332, 332.1, 332.2, 285/332.3, 417
See application file for complete search history.

(56) References Cited

U.S. PATENT DOCUMENTS

| | | | | |
|---|---|---|---|---|
| 1,098,974 | A * | 6/1914 | Reilly | 277/608 |
| 1,754,639 | A * | 4/1930 | Meyer | 285/101 |
| 1,956,692 | A * | 5/1934 | McWane | 285/295.3 |
| 2,097,850 | A * | 11/1937 | Wallace | 359/743 |
| 2,243,265 | A * | 5/1941 | Thomson | 285/235 |
| 2,853,320 | A | 9/1958 | Liebelt et al. | |
| 3,425,716 | A * | 2/1969 | Blau | 285/110 |
| 3,724,882 | A * | 4/1973 | Dehar | 285/243 |
| 4,021,061 | A | 5/1977 | Zimmerman | |
| 4,174,125 | A * | 11/1979 | Wyss | 285/110 |
| 4,175,757 | A * | 11/1979 | Emmerich | 277/603 |
| 4,288,104 | A * | 9/1981 | Nordin | 285/45 |
| 4,349,203 | A * | 9/1982 | Schulke | 277/608 |
| 4,437,689 | A | 3/1984 | Goebel et al. | |
| 4,602,792 | A * | 7/1986 | Andrick | 277/615 |
| 4,930,817 | A * | 6/1990 | Fuchs | 285/189 |
| 4,934,745 | A | 6/1990 | Healy | |
| 4,951,976 | A | 8/1990 | Boelkins | |
| 5,178,423 | A | 1/1993 | Combeau | |
| 5,338,072 | A * | 8/1994 | Bitter et al. | 285/288.1 |
| 6,089,618 | A * | 7/2000 | Neumann et al. | 285/293.1 |
| 6,276,727 | B1 | 8/2001 | Schlicht | |
| 6,471,253 | B2 * | 10/2002 | Schilt | 285/321 |
| 6,860,521 | B2 | 3/2005 | Berg | |
| 2003/0111840 | A1 | 6/2003 | O'Neill et al. | |
| 2003/0227169 | A1 | 12/2003 | Fritze et al. | |
| 2004/0183302 | A1 | 9/2004 | Allen et al. | |
| 2005/0200122 | A1 | 9/2005 | Mittersteiner et al. | |
| 2005/0242578 | A1 | 11/2005 | Eveans et al. | |

* cited by examiner

*Primary Examiner*—James M Hewitt
(74) *Attorney, Agent, or Firm*—Law Office of Ken Dallara; Ken Dallara

(57) ABSTRACT

A Vari-Stage Coupling device that accomplishes the goal of coupling different styles of tubing in one device. The coupling device allows the user to incorporate different sizes of tubing into a single fitting decreasing the confusion as to which part fits with which tubing and decreasing his time looking for the right fitting. The coupling device also allows the user to need to use only one device for most all of his coupling needs.

7 Claims, 3 Drawing Sheets

Narrow Angle

Wide Angle

VARI-STAGE COUPLING DEVICE

FIELD OF THE INVENTION

This invention is designed for use in the agricultural and horticultural arenas where fluids, mainly water, is transported from a water source to the point of application using flexible conduit generally made of polymer materials. The purpose of this invention is to facilitate the coupling of two or more pieces of conduit used to join, divert or stop the flow of fluids through the conduit, whereby multiple sizes of outside diameters can be accommodated with a single device. Currently, there exists a large gap between economically feasible single size couplers and expensive and complex multi-size couplers.

BACKGROUND OF THE INVENTION

This invention involves the coupling of flexible tubing where the wall thickness is approximately between 10% and 25% of the total cross-sectional area of the tubing. This tubing is generally used in agricultural, horticultural and landscaping applications to serve as a conduit carrying water and fluids from a source to an area of application. In this area of application, many different manufacturers vie for a limited market and thus market fitting sizes that are unique to their tubing, forcing the user to use only their fittings onto their tubing. Coupling devices thereby need to adapt too many size variations in order to work with the myriad of sizes available. Tubing sizes usually decrease as the tubing gets closer to the point of application. In carrying water from a far away source, the tubing starts with larger diameters and due to pressure loss and friction, the flow of water decreases requiring smaller and cheaper tubing to carry the required volume of water. Thus couplings are needed to be able to adapt from one size of tubing to the next. The tubing used in this application is generally made from polyethylene of varying densities and wall thicknesses.

The current state of the art coupling devices vary by how they interact with the tubing to create a firm enough hold to prevent leakage, yet soft enough not to crush the thin walls of the tubing thereby restricting flow and creating pressure loss. At low pressures, an internal barb can be used whose circumferentially related, triangularly shaped barbs are greater in diameter than the internal diameter of the tubing. But with increasing pressures, internal barbs fail to retain the tubing thereupon the barbs, developing the need for coupling devices to be used that either grab onto the end of the tubing or use the hydrostatic pressure of the water to firmly hold the tubing against a barrier preventing slippage and leakage. These two styles of coupling serve as the current state of development in coupling technology.

Those devices that grab onto the end of the tubing usually are two piece devices that contain an internal stabilizing piece either statically mounted within the coupler or is separately engaged away from the coupler. These couplers use a mechanical means to forcibly assist the inside diameter of the tubing to expand over increasingly larger diameter of barbs protruding from an inclined conical plane as the tubing advances toward a predetermine barrier. The tubing is displaced over these barbs by using the mechanical means of a device placed over the outside diameter of the tubing which engages the tubing through friction and forcibly displaces the tubing over the barbs. The mechanical means used are generally threads which also serve as a seal should any fluids escape from the end of the tubing into the device. The inclined plane serves a dual purpose of expanding the inner diameter of the tubing thus decreasing the wall thickness producing a more pliable tube to grasp onto, and allowing for a multitude of tubing sizes to be accommodated by a single device. The decreasing wall thickness makes the surface more pliable and increases the hoop tension or strength of the tubing over the barbs as the elastic properties of the tubing causes it to try to shrink back to it's original diameter securing itself over the barbs. Prior art is replete with examples of this style of coupling. U.S. Pat. No. 2,853,320 to Liebelt et al issued on Sep. 23, 1958 shows a smooth bore with an inclined plane that stretches the inner diameter of the tubing, where a coupling nut is slid over the outside diameter of the tubing, threadably engages the device forcing the thinned tubing walls into recesses, increasing the frictional forces over the surface area of the tubing, thus holding the tubing to the device. U.S. Pat. No. 5,178,423 to Combeau issued on Jan, 12, 1993, U.S. Pat. No. 4,437,689 to Goebel et al issued on Mar. 20, 1984 and U.S. Pat. No. 4,951,976 to Boelkins issued on Aug. 28, 1990 all contain similar devices whereby the inner diameter of the tubing is forced over a mandrel with an inclined plane and an external coupling device threadably attaches the tubing to the device. They differ in the construction of the barbs on the mandrel. Combeau uses a single frusto-conical portion where the inner diameter of the tubing is allowed to relax after the barb. Goebel uses a series of reversed angled barbs resembling buttress threads that dig into the soft inner diameter of the tubing while Boelkins uses at least one circumferential barbs located directly upon the inclined plane. Currently available devices sold in commercial and retail establishments for the purpose of connecting to or diverting fluids in flexible tubing for agricultural uses include those sold by industries leaders Raindrip Incorporated under the brand name of Stretch 'n Lock® and Aquarius Brands under the brand name of Power-Loc™. The problem associated with this style of device is that it is expensive to manufacture, as unscrewing molds must be used for female threaded pieces and barbs must be fully realized in order for the device to function. This part also has a separate external nut which can be become disassociated with the main part of the device rendering it useless. Assembly of the tubing and the connecting of the external nut requires multiple operations. Another disadvantage with this style of device is that flow and pressure is effected in the system as the internal barb acts as blockages to the fluid, disrupting the flow causing pressure loss. In long tubing runs, pressure loss due to internal disruptions can be significant enough to cause additional pumps or larger pumps to be installed increasing operating costs. An advantage of this style of device is that it can be used on multiple sizes of tubing.

Another style of coupler simple holds the outside diameter of the tubing is such a style akin to a Chinese finger puzzle, where radially located fingers are directed inwardly in a reverse angle, away from the entrance of the tubing into the device. Once the tubing is past the tips of the fingers, the tubing is denied retreat as the fingers act as barbs to the outside diameter of the tubing thereby preventing escape. The more force applied to remove the tubing the deeper the fingers dig into the tubing. Prior art contains examples of this style of device. U.S. Pat. No. 6,464,266 to O'Neill et al issued on Oct. 15, 2002 shows a device with multiple interrelated rings and fingers that could be made of plastic or metallic materials for various styles of tubing and applications. Patent Application 2005/0200122 to Mittersteiner et al published on Sep. 15, 2005 shows a combination of the device first described above with the external coupling nut and fingers, whereby the fingers serve as a wedge holding solely the outside diameter of the pipe while a smooth bore mandrel is placed inside of the tubing. Here the fingers serve as an inclined plane to extract mechanical advantage of the threads. U.S. Pat. No. 6,988,747 to Allen et al issued on Jan. 24, 2006 shows a complex device whereby the fingers are engaged by a base ring portion which in addition to the reverse angle of the fingers, lock the fingers in place around the outside diameter of the tubing. Rainbird Corporation's Easy Fit Compression Components combine the locking fingers of Allen '747 along with an internal mandrel that allows the device to be used with multiple tubing sizes. The problems associated with this style of device is the cost to manufacture and eventually sell to the user. These devices contain many parts and rely on sealing O-rings or wipers to prevent leakage over the outside diameter of the tubing. Increasing the number of parts only increases the probably of product failure and increases the cost to the user.

Another style of device is the compression coupling, whereby the outside of the tubing is inserted through an opening slightly smaller than the outside diameter of the tubing. The opening of the device consists of a single triangular shaped barb which is usually shaped as a right triangle, whereby the tubing is allowed to decompress after insertion past the barb. Mechanical forces of the barb against the surface of the outside diameter of the tubing hold the tubing in place and as the pressure increases in the tubing with the presence of fluid, the tubing walls are pushed against the barbs to a greater degree than at rest, increasing the holding power of the barb. This device is commonly known in the irrigation industry as compression devices, whereby the device is attached to a coupler or diverter such as a tee or elbow usually through ultrasonic or adhesive means. Compression devices can be molded into plastic housings as well. These devices can be color coded so the user can fit the proper size of tubing into the proper device. The advantage of this style of coupling device is that it is less expensive to manufacture and sell and is a self contained unit, where there aren't any additional pieces to engage or lose. The disadvantage of this device is it's inability to adapt to multiple tubing sizes.

SUMMARY OF THE INVENTION

The device in this invention meets all of the needed criterion for a coupling device to be used on multiple sizes of tubing while being economically feasible to manufacture and sell. This invention presents a device which is capable of multiple cavity molding as well as automated assembly. This device can be used on a variety of common irrigation couplers, diverters, such as tees and elbows and connection pieces such as connections to pipe or hose threaded pieces or PVC slip style fittings. This device can be made of any thermoplastic material, though the preferred materials would be acrylonitrile butadiene styrene, polypropylene, polyamide or polyoxymethylene. As most of the common irrigation pieces in used today are made of thermoplastic, this device can be connected to the existing couplers through the use of ultrasonic or spin welding or through the use of adhesives and glues. It is important to create a device which is capable of high volumes while maintaining product integrity and quality.

This invention consists of a dual angular barb circumferentially related about a circular opening whereby multiple sizes of irrigation tubing can be accommodate therein allowing the user the flexibility of using a single coupling to join two different sizes of tubing. The dual angular barb incorporates a narrow entry angle, about half of that of a conventional compression fitting. This allows larger diameter hoses to be swedged down, without kinking or collapsing the hose upon entry into the device. The second angle is more abrupt, about twice the angle of the entry angle but is very short in length. The termination of this second angle creates a sharp edge which incises into the inserted tubing, preventing the tubing from withdrawal from the device, absent a definite effort to do so. The swedged hose is "walked" to the second angle through a series of pushing and twisting motions into the interior of the device. When one side of the hose passes the sharp barb, it is captured and helps "walk" the hose through the opening. A reverse rake angle, immediately interiorly adjacent establishes an acute angle which creates a sharp inclination away from the diameter created by the termination of the second angle. This reverse rake also allows for a stiffening of the sharp incising edge. It should be noted that the entire tubing interface region is linearly shorter than the comparable region of prior art devices. This reduction is length allows for easier and quicker insertion of tubing into the device allowing for a less fatiguing and strenuous operation by the user. This device accommodates most tubing associated with the irrigation industry where wall thickness are generally 0.070 of an inch or less.

It is an object of this invention to create a coupling device which can be used with multiple sizes of tubing while maintaining economic feasibility in manufacture.

It is another object of this invention to create a coupling device that contains a minimal number of pieces thereby reducing manufacturing time and expense, reducing errors increasing quality and creating an inexpensive product to sell in mass quantities.

It is another object of this invention to create a coupling that has an ease of use of compression fittings decreasing the learning curve in use of the device.

It is another object of this invention is to create a device that can be used as a standalone device or in combination with other existing products to allow for use of the device in different configurations.

It is recognized that there might be other avenues to accomplish the goal of coupling multiple sizes of tubing with a single device. This invention accomplishes the goal using the fewest number of common pieces—one—, while realizing all of the objects of this invention. The invention can be used as other compression devices are used across a wide range of products by using different adaptations of the device. Drawings will detail the use of the invention with common irrigation style of fittings, but does not limit the broad range of applications. The best mode to practice this invention is in the field of agricultural and horticultural irrigation applications, this by no means prevent it's application into other fields where thin wall tubing, thermoplastic, rubber or synthetic rubber in composition, is needed to be coupled, diverted or terminated.

DETAILED DESCRIPTION OF THE INVENTION

The details of this invention is best shown in use. As an invention, there are two separate products that can be produced, a molded-in device integral with the complete unit without the possibility of separation, and as part of a separate insert, which can be used in many different applications.

Figure 1:
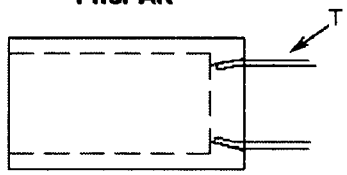
FIG. 1 shows the effect of tubing when a narrow angle is used for the entirety of the inclined slope region.
Figure 2:
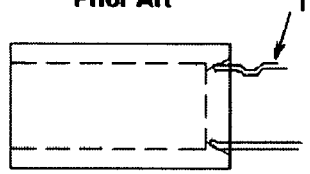
FIG. 2 shows the effect of tubing when a wide angle is used for the entirety of the inclined slope region.

FIG. 1 and FIG. 2 shows the problems associated with the prior art. When tubing T is inserted into too narrow of an angle with too long of a slope, the tubing ends are crushed which causes the outside of T to roll towards the interior of the tube T as there is a minimal amount of hoop strength associated with the style of tubing used in irrigation applications. This rolled tubing never is allowed to gain entry past the opening slope as the tubing creates an ever larger mass of rolled over tubing. FIG. 2 shows the problems associated with using too wide of an angle when tubing T is inserted thereinto. Tubing T will collapse into it's inner core as the tubing does not possess the compressive stress necessary to maintain the wall dimensions. Due to the collapse of the wall, either the tubing is not able to be pushed past the entrance slope of the prior art device or the tubing is creased creating a flow channel whereby fluid escapes from the prior art device. Both FIG. 1 and FIG. 2 show the current state of the art as it attempts to associate more than one size of tubing T into one size of compression fitting.

Figure 3:
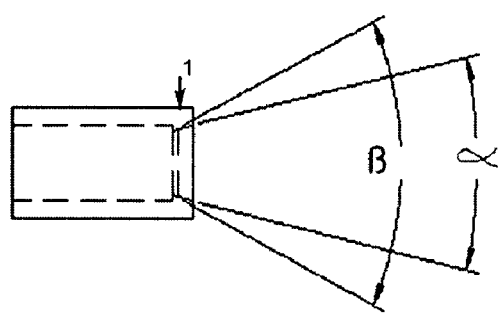
FIG. 3 shows the invention in detail showing the dual angular regions.
Figure 4:
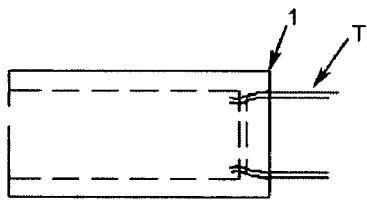
FIG. 4 shows the insertion of tubing into the device of the invention.

FIG. 3 details the invention as it is part of a molded-in insert 1. The dual angular slopes are labeled as β and α. FIG. 4 shows the effects on Tubing T with the invention molded insert 1. The multiple sizes of tubing are allowed to pass therethrough due to the shape of the dual angular slopes and the decreased distance that tubing T is compressed into the opening.

Figure 5:
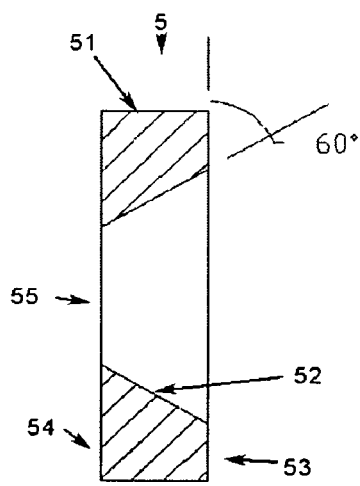
FIG. 5 shows the current state of the compression coupling entrance.
Figure 6:
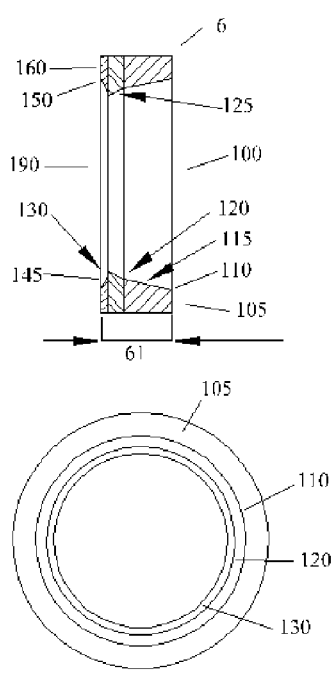
FIG. 6 shows the cross sectional detail of the invention showing the dual angular details along with the reverse rake angle and subsequent step. Below the cross sectional view is a frontal of the device in the invention.

FIG. 5 and FIG. 6 contrast the current style of compression fitting (FIG. 5) to the invention (FIG. 6) in a cross sectional view. Conventional fitting 5 possesses a single angular slope of approximately 60 degrees and has a linear dimension depth 51 between outer surface 53 where slope 52 is at it's widest and inner surface 54 where exit 55 terminates the slope at it's narrowest point. The linear depth 51 is approximately 0.300 inch though different manufacturers have varying depths. The user inserts tubing into the opening whereby slope 52 constricts the outer diameter of the tubing as it passes along slope 52 into exit 55. The user must use a rocking and twisting motion as the friction of slope 52 upon the outer surface of the tubing along with the hoop strength of the tubing creates a severe impediment to the tubing being inserted. By design, diameter of exit 55 is unique to a particular size of tubing. Multiple sizes of tubing differing in the outside diameter dimension are not capable of being used in a single prior art device.

Figure 6A:
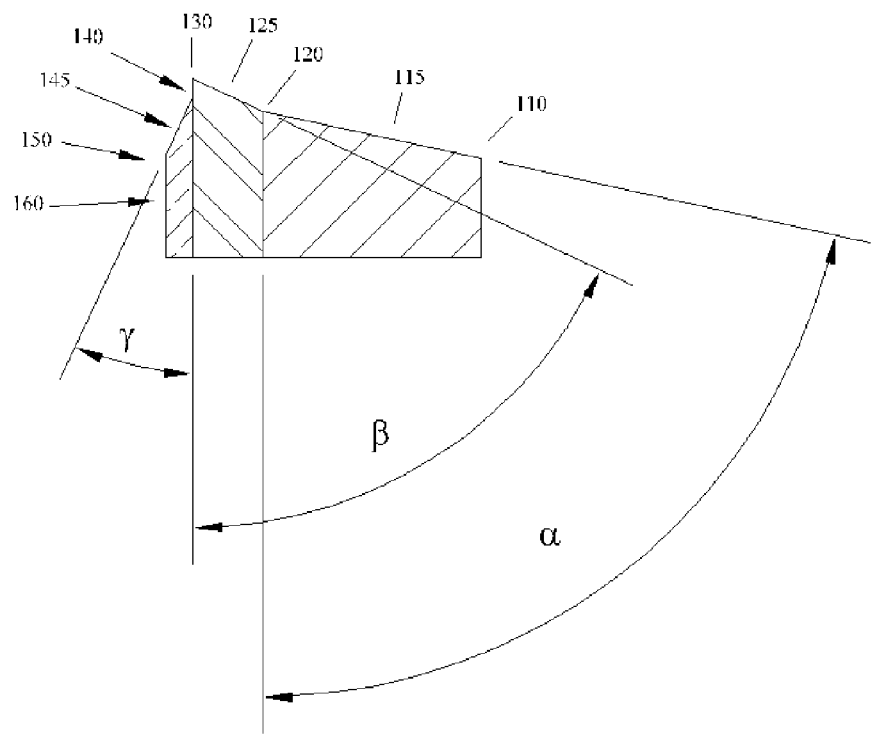
FIG. 6A shows a close-up of the angles incorporated in FIG. 6. This figure is shown with three different cross-hatchings to differentiate the three functional areas of the β, a and y angular regions.
Figure 9:
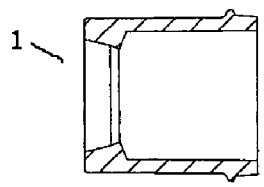
FIG. 9 shows an embodiment whereby a coupler has two molded in devices.
Figure 9:
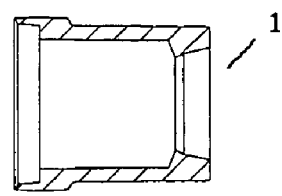
Figure 8:
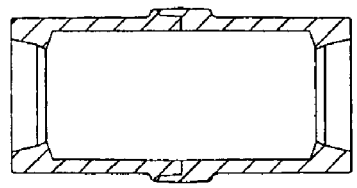
FIG. 8 shows the use of an embodiment in a coupling with one end has the invention device molded into the body and the other end has the insert.
Figure 8:
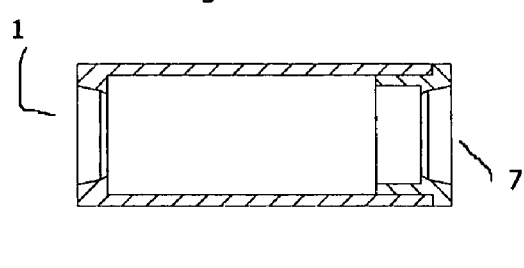

FIG. 6 shows the decreased distance of linear depth 61 as compared with the linear depth 51 of the prior art device and the dual angular arrangement with a narrow entry angle α and a more abrupt steeper angle β where angle β is approximately twice that of angle α. This dual angular arrangement, associated with the shorter linear depth 61 allows for multiple sizes of tubing to be inserted thereinto fitting 1 without the problems associated with the prior art compression fittings detailed previously when tubing larger than that designed to be handled by the prior art compression fitting is introduced thereinto. FIG. 6 and FIG. 6A details the dual angular sections of device 6 where outer diameter 110 circumscribes the opening 100 through which tubing T is inserted therein. Outer diameter 110 emanates from the surface of face 105, which forms a surface perpendicular to the central axis of the device 6. Initial slope 115, containing angle α, connects outer diameter 110 with secondary diameter 120. Secondary slope 125, containing angle β, is a more steeply graded slope than slope 115 and is generally twice the angular degrees than slope 115. Secondary slope 125 connects secondary diameter 120 with exit diameter 130. Exit diameter 130 circumscribes the exiting opening 1 90 which creates a sharp abutment which incises into the soft exterior of tubing T increasing the holding strength of the device. Reverse step 140 supports the sharpness of the abutment created by exit diameter 130. It is the termination of slope 125 at diameter 130, which is supported by step 140, which incises into tubing T creating that part of the device that prevents escapement of tubing T once sufficiently inserted past exit diameter 130. Depth of step 140 is such as to be large enough to incise the tubing but yet small enough to provide necessary support of exit diameter 130 preventing deformation to exit 130 during the insertion of tubing T. In the current invention, a step of 0.010" was used. Reverse angle slope 145 along angle γ continues connecting the lower termination of step 140 to reverse diameter 150 which is located along exiting wall 160. The upper portion of wall 160 is defined as the location from where reverse diameter 150 emanates and the lower portion of wall 160 defines the inner diameter of the device.

Figure 7:
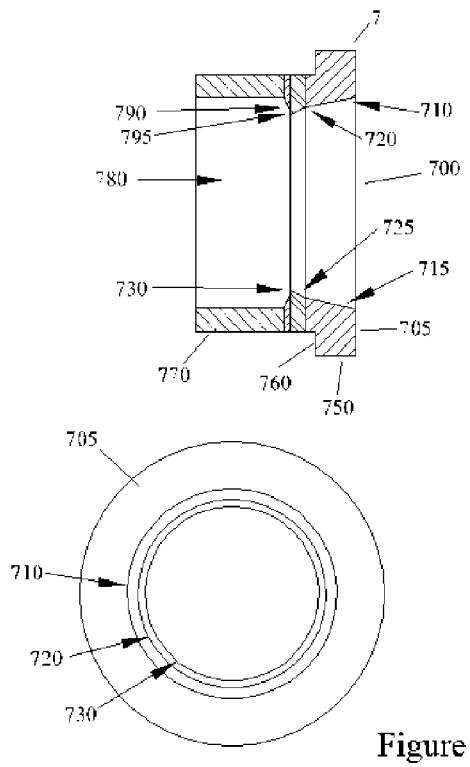
FIG. 7 shows an embodiment of the invention in a cross sectional view as used in a compression insert along with the reverse rake angle and subsequent step. Below the cross sectional view is a frontal of the device in the invention.
Figure 10:
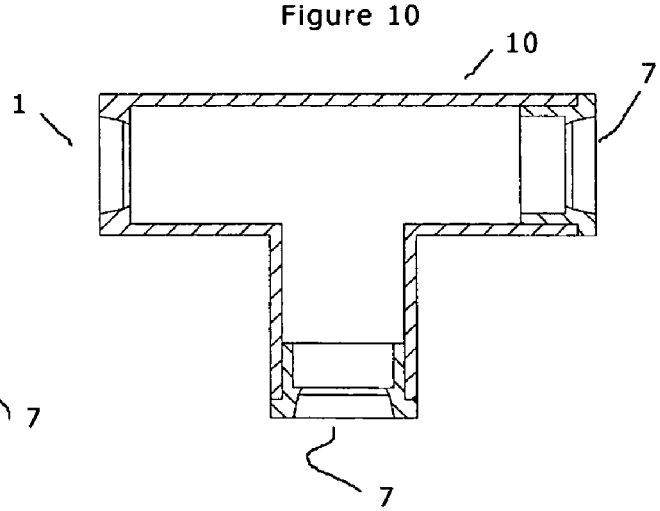
FIG. 10 shows an embodiment of a Tee Body with molded in and insert devices used.

FIG. 7 details the invention as a separable insert 7 which is connected to another body, where insert 7 is glued into or welded or attached by other means. This gives the invention applications across existing devices already used in the agricultural and horticultural arenas, thus decreasing the learning curve associated with learning new technology. FIG. 10 shows separable insert 7 attached into a Tee body 10. Molded-in insert 1 is one style of application for device 6, is shown only on one end of Tee body 10 as it would not possible to have an economically viable part molded in plastic with more than one molded-in insert 1. Insert 7 contains outer diameter 750 which reduces in diameter through step 760 to an inner diameter 770 which would create an interference fit with the inner bore of the object into which insert 7 is placed. Inner Diameter 770 can be adapted to fit a variety of objects. Opening 700 acts to accept tubing directed by the user into insert 7. Outer Insert Ring 710 is flush with the surface of face 705 of created by the shelf containing outer diameter 750 and is approximately concentric with the center of outer diameter 750. Initial slope 715 connects ring 710 with secondary ring 720. The angular degree of slope 715 is between 20 and 30 degree preferably approximately 25 degrees. Secondary slope 725 has an angle of greater degree than slope 715, with angle of slope 725 varying between 50 to 60 degrees. But the distance between Secondary Ring 720 and Exit Ring 730 is very short compared to the distance of Initial Slope 715 allowing for the tubing to be "walked" into the interior 780 of Insert 7. It is important that the linear distance between Ring 710 and Ring 730 be short enough so that the tubing does not crush and prevent it's entry into interior 780. Conventional Compression Ring 5 as shown in FIG. 5 has only one angle of entry 52 with a longer slope.

It is the shortness of the linear dimension 61 in FIG. 6 along with the initial and secondary slopes in contrast to thickness 51 that permits the tubing entry yet prevents crushing. Exit ring 730 circumscribes the area where tubing T exits the device in insert 7. The termination of slope 725 at ring 730 creates a sharp abutment which incises into the soft exterior of tubing T increasing the holding strength of the device. Reverse step 795 supports the sharpness of the abutment created by exit ring 730. It is the termination of slope 725 at exit 730, which is supported by step 795, which incises into tubing T creating that part of the device that prevents escapement of tubing T once sufficiently inserted past exit ring 730. Depth of step 795 is such as to be large enough to incise the tubing but yet small enough to provide necessary support of exit ring 730 preventing deformation to ring 730 during the insertion of tubing T. In the current invention, a step of 0.010" was used. Reverse angle slope 795 continues connecting the lower termination of step 795 to inner bore 780 along an angle of approximately 60 degrees.

Both FIGS. 6 and 7 show the outside face as a round as used in this invention. This does not limit nor does it define the application of this device into having a face of other shapes. This is especially true using insert 7 as outer diameter 750 can also be a rhombus, triangular or any other shape to fit the application in which insert 7 is placed into. The shape of the rings in this device are circular in nature, as most irrigation tubing is round without a surface profile. This invention is not limited to profiles of tubing that are exclusively circular in nature as this technology allows for the quick insertion with minimal effort of tubing of varying outside dimensions.

In the best mode to practice this invention, Acrylonitrile butadiene styrene or glass reinforced polypropylene plastic has been used. Both materials present advantages in terms of cost, manufacturability and compatibility with common materials used in the irrigation fields. This disclosure does not limit this invention's device to only those materials and devices made of other materials, through other processes, will be considered within the spirit of this invention. This novel use of a dual angular approach to accommodate a multitude of tubing sizes has not been approached in the prior art. As such, other applications and industries where compression style of couplings are used to hold tubing whose walls are pliable enough for insertion into this device, will be considered within the spirit of this invention.

What is claimed is:

1. A Variable Stage Coupling Device for conjoining flexible tubing comprising;

an exterior portion possessing a facing surface, having a centerpoint along a central axis perpendicular to said facing surface and an opening to allow ingress of said flexible tubing;

an interior portion, axially aligned with said exterior portion, having a centerpoint, possessing a common central axis with said exterior portion, an exiting surface and an opening to allow for egress of said flexible tubing;

a first angularly aligned conical section, interiorly inclined emanating from said exterior portion toward said centerpoint of said interior portion, axially aligned with said common central axis, following a consistent angle $\alpha$ terminating at a first edge that is formed by a first plane bisecting said first angularly aligned conical section;

a second angularly aligned conical section, interiorly inclined emanating from said first edge of said first angularly aligned section, sloped inwardly toward said centerpoint of said interior portion, coaxial with said first angularly aligned section, following a consistent angle of $\beta$, said second angularly aligned conical section terminating at a second edge formed by a second plane bisecting said second angularly aligned conical section, said second plane being parallel to said first plane; and a reverse angularly aligned conical section, interiorly inclined emanating from said exiting surface of said interior portion toward said centerpoint of said exterior portion, axially aligned with said common central axis, following a consistent angle $\gamma$ terminating at a step point along said bisecting second plane, said step point is located radially below the intersection of said second plane and said second angularly aligned conical section.

2. A Variable Stage Coupling Device for conjoining flexible tubing as in claim 1 where angle $\beta$ is between 45-55 degrees.

3. A Variable Stage Coupling Device for conjoining flexible tubing as in claim 1 where angle $\alpha$ is between 20-30 degrees.

4. A Variable Stage Coupling Device for conjoining flexible tubing as in claim 1 where angle $\gamma$ is between 45-75 degrees.

5. A Variable Stage Coupling Device for conjoining flexible tubing as in claim 1 where said device is integral with a separable housing, said housing being capable of attachment to a variety of coupling device bodies.

6. A Variable Stage Coupling Device for conjoining flexible tubing as in claim 1 where said device is configured to be integral therewith a single housing.

7. A Variable Stage Coupling Device for conjoining flexible tubing as in claim 1 where said opening of said exterior portion is shaped to match the profile of said flexible tubing.

* * * * *